United States Patent [19]

Murakami et al.

[11] Patent Number: 4,883,287
[45] Date of Patent: Nov. 28, 1989

[54] DOUBLE LINK TYPE SUSPENSION SYSTEM WITH STABILIZER BAR

[75] Inventors: Takuya Murakami, Atsugi; Yoichiro Kato; Kenji Terauchi, both of Zama, all of Japan

[73] Assignee: Nissan Motor Co., Ltd., Yokohama, Japan

[21] Appl. No.: 259,193

[22] Filed: Oct. 18, 1988

[30] Foreign Application Priority Data

Oct. 19, 1987 [JP] Japan ............................ 62-159811[U]
Oct. 19, 1987 [JP] Japan ............................ 63-159812[U]

[51] Int. Cl.$^4$ .............................................. B60G 15/00
[52] U.S. Cl. .................................... 280/665; 280/666; 280/696; 280/723
[58] Field of Search ............... 280/665, 666, 667, 668, 280/670, 696, 701, 723, 724

[56] References Cited

U.S. PATENT DOCUMENTS

| 4,113,278 | 9/1978 | Rissberger | 280/689 |
|---|---|---|---|
| 4,377,298 | 3/1983 | Finn et al. | 280/667 |
| 4,538,831 | 9/1985 | Kami et al. | 280/666 |
| 4,583,759 | 4/1986 | Kami et al. | 280/673 |
| 4,591,184 | 5/1986 | Matschinsky | 280/666 |
| 4,632,423 | 12/1986 | Tanahashi | 280/665 |
| 4,753,455 | 6/1988 | Murakami et al. | 280/696 |
| 4,784,406 | 11/1988 | Stinson | 280/665 |
| 4,802,688 | 2/1989 | Myrakami et al. | 280/668 |
| 4,810,002 | 3/1989 | Kakimoto et al. | 280/666 |

FOREIGN PATENT DOCUMENTS

| 253383 | 1/1988 | European Pat. Off. . |
|---|---|---|
| 253384 | 1/1988 | European Pat. Off. . |
| 279135 | 8/1988 | European Pat. Off. . |
| 3331282 | 3/1985 | Fed. Rep. of Germany . |
| 2475995 | 8/1981 | France . |
| 59-96007 | 6/1984 | Japan . |
| 60-135314 | 7/1985 | Japan . |
| 62-120208 | 6/1987 | Japan . |
| 322473 | 12/1929 | United Kingdom . |
| 2034645 | 6/1980 | United Kingdom . |
| 2069947 | 9/1981 | United Kingdom . |

Primary Examiner—Kenneth R. Rice
Attorney, Agent, or Firm—Foley & Lardner, Schwartz, Jeffery, Schwaab, Mack, Blumenthal & Evans

[57] ABSTRACT

A double link type suspension system for an automotive vehicle is comprised of an extension member movably connecting the upper section of a knuckle and an upper control arm. The knuckle upper section and the lower end section of the extension member are connected through a rotatable joint mechanism including a cylindrical member fixed to the extension member whose axis is aligned with the axis line passing through a joint between the lower section of the knuckle and a lower control arm. A pivot shaft fixed to the knuckle upper section is disposed inside a pair of deep groove ball bearings supported inside the cylindrical member. Additionally, a stabilizer bar is provided in such a manner that its end section is attached to the extension member lower end section at a position closer to the center axis of the vehicle body, thereby preventing steering effort change caused by change of steering turn angle of the wheel.

39 Claims, 11 Drawing Sheets

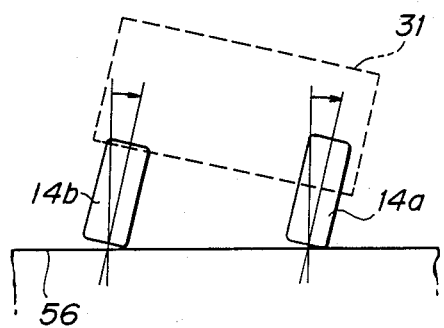
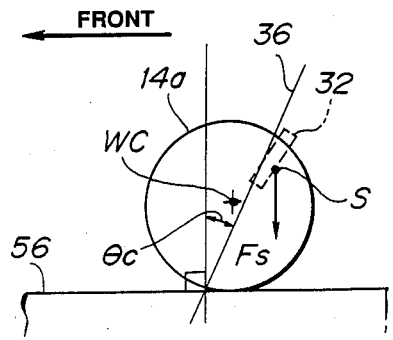
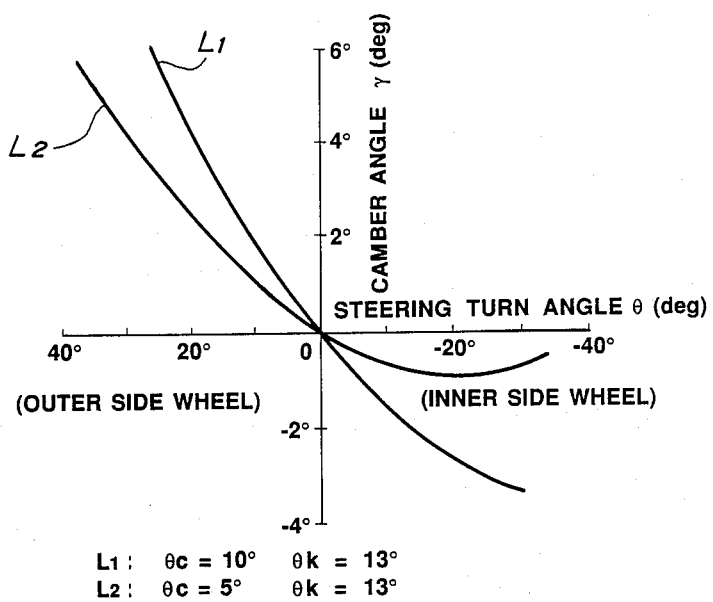

DOUBLE LINK TYPE SUSPENSION SYSTEM WITH STABILIZER BAR

BACKGROUND OF THE INVENTION

1. Field of the Invention

The present invention relates generally to a double link type suspension system, used for example, in an automotive vehicle, and more particularly to a double wish-bone type suspension system having upper and lower control arms and a shock absorber installed between a vehicle body side and a wheel side.

2. Description of the Prior Art

In connection with automotive vehicles, a variety of double link type suspension systems have been proposed and put into practical use as disclosed, for example, in Japanese Patent Provisional (First) Publication No. 59-96007 (referred hereinafter to as "the first prior art") and in Japanese Patent Provisional (First) Publication No. 60-135314 (referred hereinafter to as "the second prior art"). In a suspension system of the first prior art, an upper section of a knuckle is upwardly extended over a wheel to form an upper end thereof, which upper end is connected through an upper control arm to a vehicle body. In a suspension system of the second prior art, an upper control arm is longer than usual, and a steering axis (kingpin axis) is set irrespective of the upper control arm. Additionally, there exists an automotive structure (not of double link type) (referred to as "the third prior art") in which an end section of a stabilizer bar is attached to a strut whose lower end is secured to a steering knuckle so that torsion is applied to the stabilizer bar along with vertical movement of the wheels.

Now in order to obtain a suitable suspension geometry, the upper control arm of the double link type suspension system is required to ensure a considerable length and therefore cannot be significantly shortened.

The above-summarized prior arts will now be discussed. In the case of the first prior art suspension system, the inboard end of the upper control arm is supported to a vehicle body while the outboard end of the same is connected to the upper end of the knuckle, and additionally the upper control arm cannot be shortened for the above-mentioned reason, thereby allowing a wheel house to extend to the side of an engine compartment in accordance with the length of the upper arm. In addition, a shock absorber is disposed generally parallel with the upwardly extended knuckle upper section. Thus, the width of the wheel house is enlarged, thereby unavoidably, minimizing the width of the engine compartment. Particularly in this first prior art suspension system, since the knuckle disposed parallel with the shock absorber is turned together with the wheel during steering, a sufficient wide space is necessary between them in order to prevent interference therebetween during turning of the vehicle. This wide space necessarily enlarges the width of the wheel house. Furthermore, the turning of the knuckle together with the wheel requires a ball joint large in height dimension for connection between the upper end of the knuckle and the upper control arm, so that the height of the wheel house is unavoidably enlarged.

In the case of the second prior art suspension system, the distance between the upper and lower control arms is relatively small whereby any variation of camber angle and caster angle due to assembly error of suspension system component parts is a relatively high value. Additionally, such camber angle and caster angle greatly change depending upon vertical swing of the upper and lower control arms. These provide an insufficient controllability of vehicle steering.

Furthermore, in the case of the third prior art suspension system which is constructed such that the stabilizer bar end section is attached to the tube of a shock absorber in the strut, the installation section of the stabilizer bar unavoidably swings around with the strut which turns during vehicle steering, so that elasticity of the stabilizer bar causes steering effort or force from variation in accordance with change in steering turn angle of the wheel. In this connection, a relatively large space is required to prevent interference of the swinging-around stabilizer bar with other parts. In order to prevent such swing-around motion of the stabilizer bar end section, a mechanism for absorbing the swing-around motion is necessary between the stabilizer bar end section and the strut, thereby complicating the structure and raising production cost of the suspension system.

Additionally, during turning of the vehicle, an outer side wheel relative to the vehicle turning direction is raised relative to the vehicle body while an inner side wheel is lowered, thereby increasing camber angle and thus reducing the ground contacting area of the wheel. This unavoidably lowers the gripping force of the wheel to the ground, thereby degrading vehicle driving safety.

SUMMARY OF THE INVENTION

An object of the present invention is to provide an improved double link type suspension system for a vehicle, adapted to increase freedom of selection of location of the outboard end section of an upper control arm by separating elements for setting a steering axis and elements for setting camber angle, thereby minimizing the width and height of a wheel house as much as possible to enlarge the width of an engine compartment located thereinside while setting a suitable wheel alignment.

Another object of the present invention is to provide an improved double link type suspension system in which assembly error due to a rotatable joint mechanism is reduced as much as possible to reduce camber angle error while facilitating assembly operation of the system.

A further object of the present invention is to provide an improved double link type suspension system which is arranged to prevent steering effort or force from variation caused due to change in steering turn angle of road wheels while preventing gripping force of the wheel to the ground from lowering during turning of the vehicle.

Therefore, the double link type suspension system of the present invention is comprised of an extension member for movably connecting the upper section of the knuckle and an upper control arm movably connected to the side of a vehicle body of a vehicle. A lower control arm is provided to swingably connect the lower section of the knuckle and the vehicle body side. Additionally, a stabilizer bar is provided in such a manner that its one end section is connected to the extension member at a position inside the axis line relative to the vehicle body.

With the above arrangement, a steering axis corresponds to the axis line passing through both the joint between the knuckle lower section and the lower control arm outboard end section and another joint between the knuckle upper section and the extension member, whereby the upper control arm can be situated regardless of the steering axis. Additionally, the component parts turnable together with the wheel (tire) are limited to ones located between both the joints, i.e., near an axle shaft of the wheel. Consequently, interference among the component parts, particularly between the extension member and a shock absorber, during steering can be suppressed as much as possible. This allows the width of the wheel house to become small, thereby enlarging the width of an engine compartment upon combination with the effect of no relation of the upper control arm to the steering axis so that a point at which the upper control arm inboard end section is attached to the vehicle body side is situated near the side section of the vehicle body. Additionally, since the extension member does not turn with the knuckle during steering, the extension member and the upper control arm can be connected with each other by a joint using an elastomeric insulation bushing, thereby minimizing the height of the joint as compared with a ball joint. This lowers the top level of the wheel house and therefore of a hood defining the engine compartment.

Furthermore, variation of camber angle (determined depending upon both the upper and lower control arms) along with vertical movement of the wheel can be suppressed to a lower value, because the upper control arm comes to no relation to setting of the steering axis and therefore can be prolonged while enlarging the distance between the upper and lower control arms by virtue of employing the extension member. This greatly contributes to setting the wheel alignment appropriately.

Moreover, with the above-arrangement, since the stabilizer bar is installed to the extension member which makes its vertical movement together with the wheels, the vertical movement of the wheels can be precisely transmitted to the stabilizer bar without increase or decrease. Additionally, since the installation position of the stabilizer bar to the extension member is closer to the center axis of the vehicle body so that the point of application of the stabilizer bar is far from the wheel, a smaller suppression force to vertical movement of the wheel is sufficient, thereby effectively suppressing the vertical movement of the wheel. Accordingly, assuming that the stabilizer bar has the same strength as in a conventional arrangement, the stabilizer bar of the present invention is higher in wheel vertical movement suppression effect than the conventional arrangement. Furthermore, the suppression force of the stabilizer bar effectively acts in the direction to suppress the camber relative to the ground of the wheel, thereby minimizing change of the camber relative to the ground of the wheel during roll or the like of the vehicle. This can prevent lowering of the gripping force of the wheel to the ground.

BRIEF DESCRIPTION OF THE DRAWINGS

In the drawings, like reference numerals designate corresponding elements and parts throughout all the figures, in which:

FIG. 7A to 7C are explanative views showing movements of a vehicle body during roll of a vehicle, in which FIG. 7A shows a front view of the vehicle, FIG. 7B shows a front view of an outer side wheel relative to vehicle turn direction, and FIG. 7C shows a front view of an inner side wheel relative to the vehicle turn direction;

FIG. 14A and 14B are explanative views of movements of the vehicle body during roll of the vehicle, in which FIG. 14A shows the rear view of the vehicle, and FIG. 14B shows the side view of the outer side wheel relative to vehicle turn direction;

FIG. 15 is a graph showing the relationship between steering turn angle of the wheel and camber angle.

DETAILED DESCRIPTION OF THE INVENTION

Figure 1:
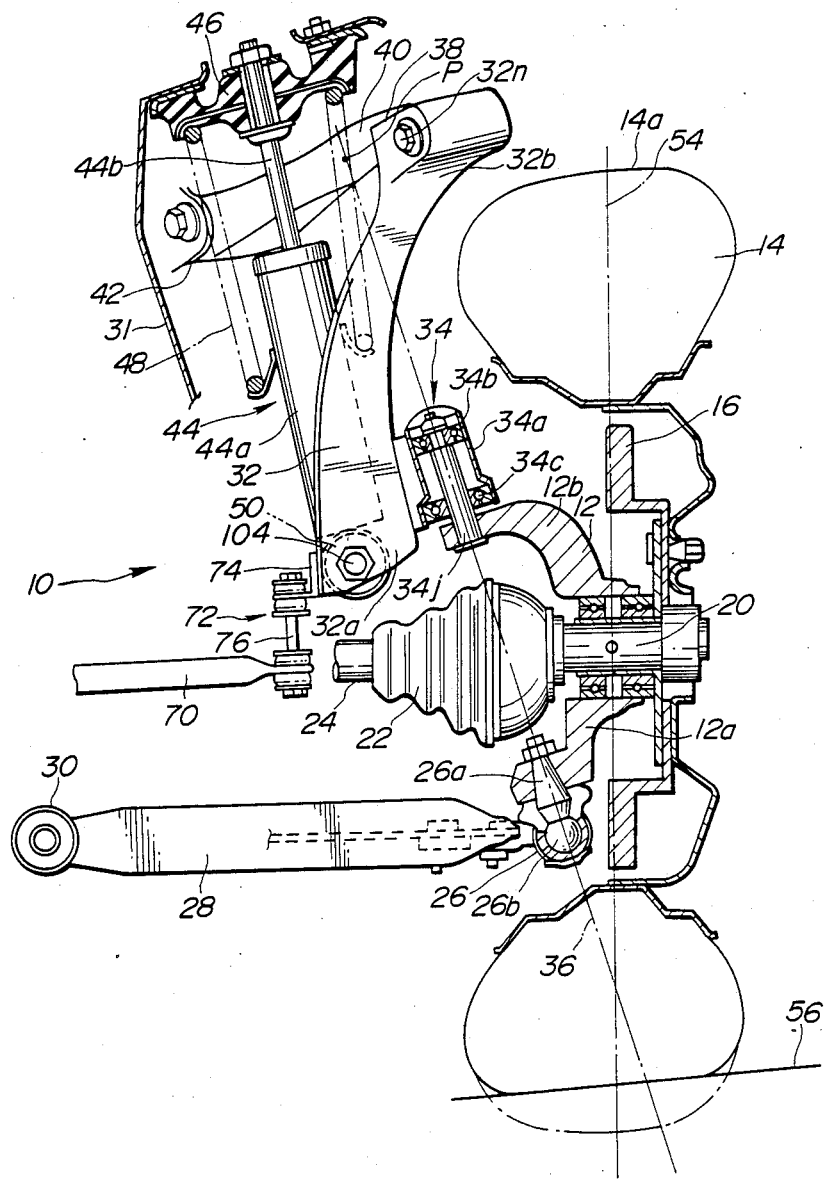
FIG. 1 is a fragmentary front elevation, partly in section, of a first embodiment of a double link type suspension system in accordance with the present invention.

Referring now to FIGS. 1 to 5, there is shown an embodiment of a double link type suspension system 10 in accordance with the present invention. The suspension system 10 of this embodiment is a front suspension system of the double wish-bone type and is used for an automotive vehicle of the type wherein a driving force from an engine (not shown) is transmitted to front wheels (only one wheel 14 shown), for example, the front engine front drive (FF) type or the four wheel drive (4WD) type. The suspension system 10 is comprised of a steering knuckle 12 for rotatably supporting the front wheel 14 provided with a brake disc 16. The knuckle 12 rotatably journals through bearings 18 an axle shaft 20 of the wheel 14, which shaft 20 is connected through a constant velocity joint 22 to a drive shaft 24 driven under the driving force from the engine.

The lower section 12a of the knuckle 12 is connected through a ball joint 26 to the outboard end section of a lower control arm 28 whose inboard end section is connected through a rubber (elastomeric) insulation bushing 30 to a bracket (not shown) of a vehicle body 31. The ball joint 26 includes a ball stud 26a secured to the knuckle lower section 12a, and a retainer 26b which is secured to the outboard end section of the lower control arm 28. The upper section 12b of the knuckle 12 rotatably connected to an extension bracket or member 32 by a rotatable joint mechanism 34.

Figure 2:
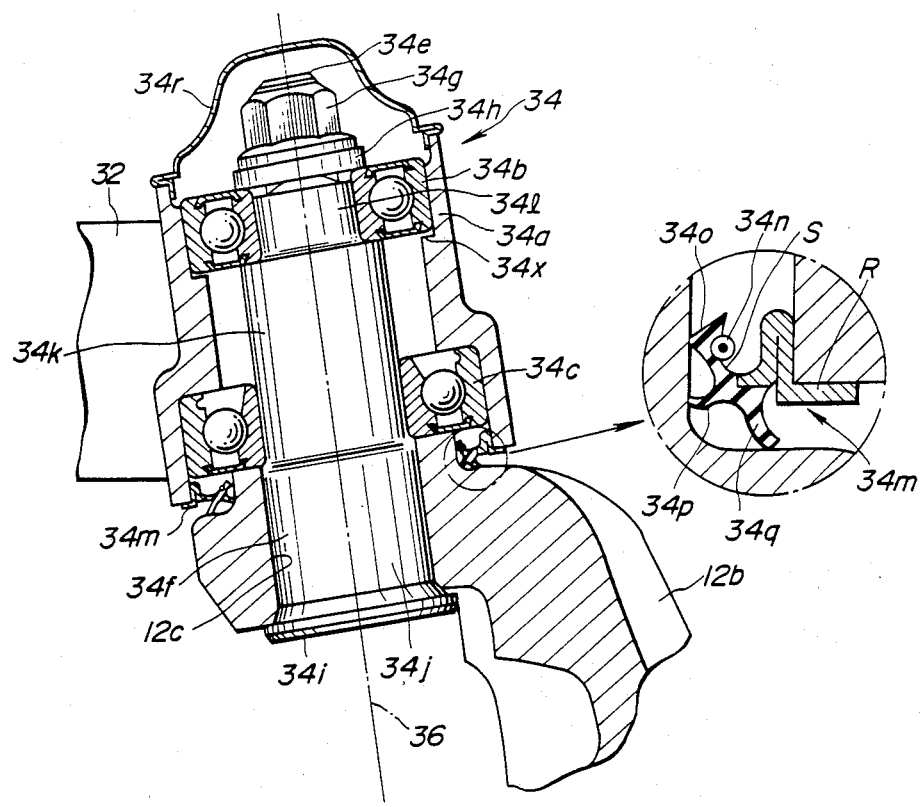
FIG. 2 is an enlarged sectional view of a rotatable joint mechanism used in the suspension system of FIG. 1.
Figure 3:
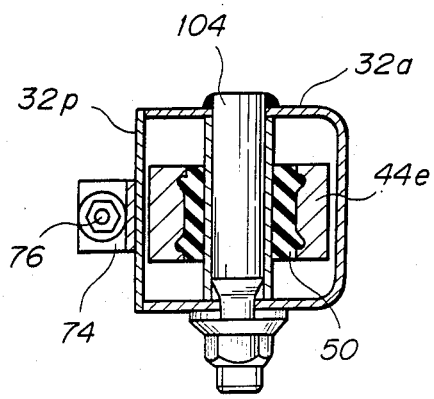
FIG. 3 is a transverse sectional view of a lower end section of an extension member of the suspension system of FIG. 1.

As best shown in FIG. 2, the rotatable joint mechanism 34 includes a generally cylindrical member 34a which is integral with the extension bracket lower end section 32a to form a part of the extension bracket 32. The cylindrical member 34a has an axis which is aligned with the axis of the ball stud 26a of the ball joint 26 to form a steering axis (kingpin axis) 36. Upper and lower deep groove ball bearings 34b, 34c are press-fitted inside the cylindrical member 34a and respectively located at the opposite end sections of the cylindrical member 34a. The ball bearings 34b, 34c are spaced from each other and coaxial with each other with respect to the axis of the cylindrical member 34a. A pivot shaft 34f is inserted inside the inner races of the ball bearings 34b, 34c in such a manner that the ball bearings 34b, 34c are mounted on the pivot shaft 34f. The pivot shaft 34f is inserted in a through-hole 12c formed in the knuckle upper section 12b and fixedly secured at its lower end section with the knuckle upper section 12b. The pivot shaft 34f is formed at its upper end section with a threaded portion 34e with which a tightening nut 34g is engaged. A washer 34e is provided between the nut 34g and the inner race of the upper ball bearings 34b. In this instance, the inner diameter of the upper ball bearing 34b is set to be smaller than that of the lower ball bearing 34c.

The pivot shaft 10f has an annular flange section 34i in contact with the lower surface of the knuckle upper section 12b. A large diameter section 34j of the pivot shaft 10f is integral with the annular flange section 34i and press-fitted in the through-hole 12c of the knuckle upper section 12b. A medium diameter section 34k of the pivot shaft 34f is integral with the large diameter section 34j and inserted inside the inner race of the lower ball bearing 34c in such a manner that the inner race of the ball bearing 34c is in tight contact with the peripheral surface of the medium diameter section 34k. A small diameter section 34l of the pivot shaft 34f is integral with the medium diameter section 34k and inserted inside the inner race of the upper ball bearing 34b in such a manner that the inner race of the ball bearing 34b is in tight contact with the peripheral surface of the small diameter section 34l. The medium diameter section 34k is smaller in diameter than the large diameter section 34j and larger in diameter than the small diameter section 34l. The threaded section 34e is integral with the small diameter section 34l. Accordingly the pivot shaft 34f is coaxial with the cylindrical member 34a and has its axis aligned with the steering axis 36. As shown, the upper end surface of the medium diameter section 34k of the pivot shaft 34f is slightly upwardly separate from the surface of a step section 34x formed at inner surface of the cylindrical member 34a, so that the lower surface of the inner race of the press-fitted ball bearing 34b is slightly spaced apart from the surface of the step section 34x. Accordingly, even upon completion of tightening operation of the nut 34g, a slight clearance is formed between the inner race lower surface of the ball bearing 34b and the upper surface of the step section 34x of the cylindrical member 34a.

Additionally, an annular seal member 34m is installed to the lower end of the cylindrical member 34a on the side of the ball bearing 34c. As shown in an encircled enlarged view, the seal member 34m includes an annular rigid section R press-fitted to the inner peripheral surface of the lower end of the cylindrical member 34a. An annular elastomeric sealing section S is fixedly connected to the press-fitted rigid section R and includes an axially extending annular upper lip portion 34o, a radially outwardly extending annular intermediate lip portion 34p and an axially extending annular lower lip portion 34q. The upper and intermediate lip portions 34o, 34q are in sealing contact with the outer peripheral surface of the cylindrical portion of the knuckle upper section 12b, which cylindrical portion is contacted at its upper surface with the inner race of the ball bearing 34c. The lower lip portion 34q is in seal contact with the surface of the knuckle upper section 12b. Additionally, a tightening ring 34n is secured to the inner surface of the upper lip portion 34o to bias the lip portions 34o, 34p onto the surface of the cylindrical portion of the knuckle upper section 12b. A seal cap 34r is fitted to the upper end of the cylindrical member 34a on the side of the upper ball bearing 34b so as to cover the threaded end section 34e of the pivot shaft 34f.

Thus the knuckle 12 is rotatable around the steering axis or kingpin axis 36 passing through the rotatable joint mechanism 34 joining the knuckle upper section 12b and the extension bracket 32 and the joint (the rotational axis of the ball joint 26) between the knuckle lower section 12a and the lower control arm 28. Additionally, the ball bearings 34b, 34c disposed between the cylindrical member 34a and the pivot shaft 34f are sealingly covered with the seal member 34m and the cap 34r, thereby securely preventing stones from engaging into and water from penetrating into the ball bearings 34b, 34c during vehicle cruising. This effectively avoids driving impossibility of the vehicle due to stones and water freezing.

The extension bracket 32 is extended upward and curved outward relative to the vehicle body 31 generally in a manner to surround the upper section of the wheel 13 so that the upper end section 32b of the extension bracket 32 reaches a position above the upper-most section 14a of the wheel 14. The extension bracket upper end section 32b is swingably connected through rubber (elastomeric) insulation bushings 38 to the outboard end section of an upper control arm 40 whose inboard end section is swingably connected through rubber (elastomeric) insulation bushings 42 to a bracket (not shown) of the vehicle body 31. It will be understood that the joint between the extension bracket 32 and the upper control arm 40 is sufficient to be one using the rubber insulation bushing 38 having a smaller height dimension because the extension bracket 32 is merely swingable relative to the upper control arm 40.

Figure 5:
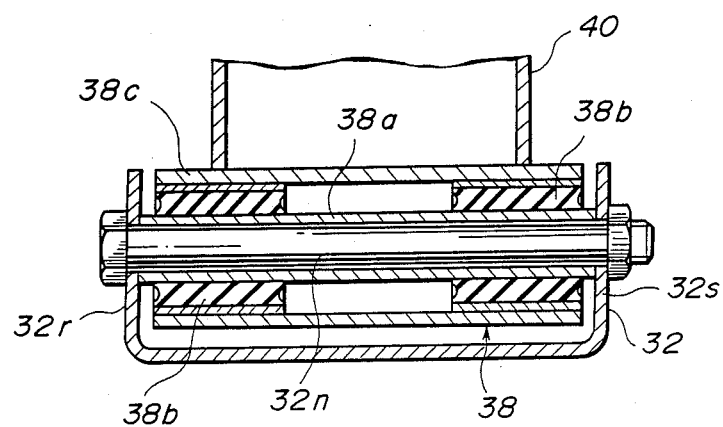
FIG. 5 is a transverse sectional view of a joint between the extension member and an upper control arm in the suspension system of FIG. 1.

As best shown in FIG. 5, the above-mentioned joint between the extension bracket upper end section 32b and the upper control arm outboard end section includes a generally horizontally extending rod member 32n secured to the tip end portion of the upper end section 32b of the extension bracket 32 in such a manner as to pass through the bent side parts 32r, 32s of the extension bracket tip end portion. A rubber insulation bushing 38 is securely mounted on the rod member 32n in such a manner as to be covered at its opposite ends and surface of the side of the wheel 14 by the extension member tip end portion. The rubber insulation bushing 38 includes an inner cylinder 38a mounted on the rod member 32n. Two cylindrical elastomeric (rubber) members 38b, 38b are mounted on and bonded to the inner cylinder 38a by means of vulcanization adhesion. An outer cylinder 38c secured to the upper control arm 40 is mounted on the cylindrical elastomeric members 38b, 38b. The outer cylinder 38c may form part of the upper control arm 40. Thus the extension bracket 32 and the upper control arm 40 are swingable relative to each other under distorsion of the cylindrical elastomeric members 38b.

A shock absorber 44 is provided to extend generally parallel with the extension bracket 32 and is generally vertically installed between the vehicle body 31 and the lower end section 32a of the extension bracket 32. The shock absorber 44 includes an outer tube 44a whose lower end section is connected through a rubber (elastomeric) insulation bushing 50 to the lower end section 32a of the extension bracket 32. More specifically, the shock absorber 44a is provided at its lower section with a collar 44e which is mounted on the insulation bushing 50, which is in turn mounted on an installation bolt 104 fixedly secured to the lower end section 32a of the extension bracket 32. A piston rod 44b extending from the outer tube 44a is connected through a mount rubber 46 to the vehicle body 31. Additionally, a coil spring 48 is disposed coaxially with the shock 44 and installed between the mount rubber 46 and the shock absorber outer tube 44a. In this connection, the extension bracket 44 is constructed of press-formed sheet metal and formed generally channel-shaped to have a generally C-shaped cross-section. Accordingly, the extension bracket 44 covers the outer side (near the wheel 14) of the shock absorber outer tube 44a and the lower-half of the coil spring 48 in such a manner as to surround the shock absorber 44 and the part of the coil spring 48. As seen from FIG. 1, about half the outer periphery of the shock absorber 44 and the coil spring 48 is covered with the extension bracket 32. It will be understood that the generally channel-shaped extension bracket 32 offers a higher strength to the extension bracket itself while allowing the distance between the shock absorber 44 and the wheel 14 to be narrowed thereby to minimize the space occupied by them. Though not shown, a knuckle arm is provided to be connected to a steering linkage (not shown) through which a steering force or effort is transmitted to the knuckle 12.

Figure 4:
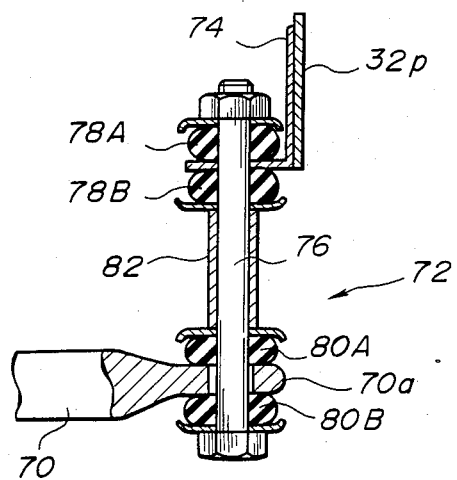
FIG. 4 is a vertical sectional view of a joint structure for connecting a stabilizer bar and the lower end section of the extension member in the suspension system of FIG. 1.
Figure 6:
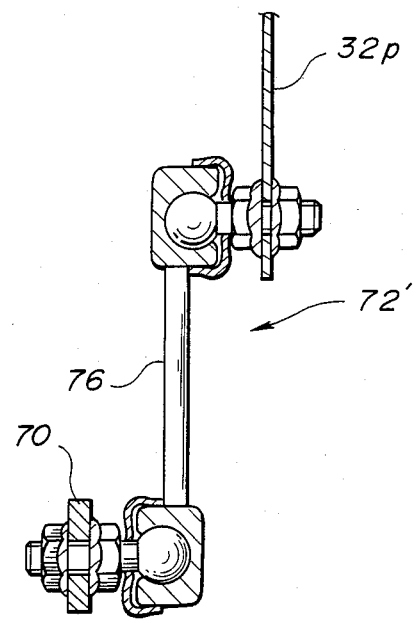
FIG. 6 is a vertical sectional view of a joint structure which may be used in place of that of FIG. 4.

A stabilizer bar 70 is provided in such a manner as to connect the extension bracket 32 of the suspension system 10 and that of another similar suspension system (not shown) which is oppositely disposed with respect to the longitudinal center axis of the vehicle body 31. The stabilizer bar 70 is secured at its central section with a frame of the vehicle body 31. More specifically, one end section 70a of the stabilizer bar 70 is securely connected to an installation plate 32p through a joint structure 72 as shown in FIG. 4. The installation plate 32p is provided in such a manner as to close an open section of the lower section 32a of the extension bracket 32, the open section being located close to the center axis of the vehicle body. In other words, the installation plate 32p is located on the side of the center axis of the vehicle relative to the longitudinal axis of the extension bracket 32. The joint structure 72 includes an attachment bracket 74 fixedly secured to the installation plate 32p of the lower end section 32a of the extension bracket 32 by known means such as welding or bolt-connection. The attachment bracket 74 is formed with an opening (no numeral). A connecting rod 76 is provided to pierce the opening of the attachment bracket 74 and an opening (no numeral) formed in the end section 70a of the stabilizer bar 70, thereby securely connecting the attachment bracket 74 and the stabilizer bar 70. Annular damping rubbers 78A, 78B are mounted on the upper end section of the connecting rod 76 in such a manner that a bracket 74 is put between them. Similarly, annular damping rubbers 80A, 80B are mounted on the lower end section of the connecting rod 76 in such a manner that stabilizer bar 76 is put between them. A spacer 82 is mounted on the connecting rod 76 and interposed between the rubbers 78B, 80A. The rubbers 78A, 80B are pressured axially inwardly to obtain secure connection of the attachment bracket 74 and the stabilizer bar end section 80a by bolt-and-nut connection using the connecting rod 76. By virtue of the damping rubbers 78A, 78B, 80A, 80B, axial vibration applied to the connecting rod 76 can be effectively damped. It will be understood that the joint structure 72 may be replaced with another joint structure 72' as shown in FIG. 6, in which ball joints are used.

In this embodiment, a center line 54 of the wheel 14 (in the direction of width of the wheel in a cross-section including the axis of rotation of the wheel) crosses the steering axis 36 at a position above a horizontal plane 56 at which the wheel (tire) 14 is in contact with the ground or road surface as illustrated in FIG. 1. Furthermore, the steering axis 36 intersects the plane 56 at a position lying outward of the wheel center line 54 thereby to the so-called negative scrub radius. It is to be noted that since the steering axis 36 is determined by locations of both the joint between the knuckle 12 and the extension bracket 32 and the joint between the knuckle 12 and the lower control arm 28, setting the scrub radius positive, negative or zero is not related to the arrangement of the upper control arm 40. Consequently, the rubber insulation bushing 38 between the upper control arm 40 and the extension bracket 32 can be located without any restraint from the steering axis 36. In this connection, in this embodiment the rubber insulation bushings 38 are located above the wheel 14 so as to project outward relative to the vehicle body so that the rubber insulation bushings 38 and the wheel 14 overlap each other in the direction of width of the vehicle. This ensures a sufficient length of the upper control arm 40 to obtain an optimum wheel alignment while locating the inboard end section of the upper control arm 40 at a position near the outside of the vehicle in the direction of width of the vehicle. It will be understood that this is a reason why the width of a wheel (tire) house is minimized thereby allowing the width of an engine compartment to be even.

Thus, ensuring the sufficient length of the upper control arm 40 minimizes the difference in length between the upper and lower control arms 40, 28 thereby making possible to obtain the optimum wheel alignment. Additionally, since the vertical distance between the upper and lower control arms 40, 28 can be enlarged, variation of camber angle and caster angle due to assembly error of the suspension component parts can be minimized while suppressing development of variation of the camber angle during vertical movement of the wheel 14. Additionally, the rigidity of both the arms 40, 28 increases proportional to the square of the distance between both arms. Rigidity of the arms is enlarged, thereby improving the marginal performance of camber angle variation.

As appreciated, the weight of the vehicle body is supported by the wheel 14 through the mount rubber 46, the coil spring 48, the shock absorber outer tube 44a, the lower control arm 28 and the knuckle 12. The vertical movement of the wheel 14 can be damped by expansion and contraction of the shock absorber 44 and absorbed deflection of the coil spring 48. Here, during vertical movement of the wheel 14, the knuckle 12 and the extension bracket 32 make their vertical movement together with the wheel 14, so that the lower and upper control arms 40, 28 swing vertically. Along with this the shock absorber 44 and the coil spring 48 make their expansion and contraction. Thus, since all such members make their vertical movement, no interference occurs between a section including the knuckle upper section 12b and the extension bracket 32 and another section including the shock absorber 44 and the coil spring 48.

It will be understood that when steering force or effort is transmitted from the steering linkage through the knuckle arm 52 integral with the knuckle 12, the knuckle 12 makes its rotation around the steering axis 36, thereby turning the wheel 14 to steer the vehicle. At this time, the knuckle 12, wheel 14 and the axle shaft 20 turn around the steering axis 36 in which the knuckle 12 is rotatable at the joint mechanism 34 and therefore the extension bracket 32 does not turn. As a result, since the extension bracket 32 makes only the above-mentioned vertical movement along with the wheel 14 so that its relative movement to the upper control arm 40 is only swinging, a ball joint is unnecessary for the joint between the extension bracket 32 and the upper control arm 40, so that the rubber insulation bushings 38 are sufficient for this joint. The rubber insulation bushings 38 are smaller in height dimension than the ball joint, and consequently the height of the wheel house is minimized, thereby lowering the level of the hood of the engine compartment. In this connection, the rubber insulation bushing is smaller by about 40 mm in height dimension than the ball joint usually used for a control arm of a double wish-bone type suspension system.

As discussed above, since no rotation movement is made in the extension bracket 32 during steering of the vehicle, no force input due to steering is applied to the stabilizer bar 70 connected to the extension bracket 32. This prevents the stabilizer bar end section 70a from swinging around even during vehicle steering in which the knuckle 12 turns. Accordingly, vehicle posture stabilizing function by the stabilizer bar 70 and steering function are completely separated from each other, thereby preventing steering effort or force from variation due to swinging movement of a stabilizer during vehicle steering while rendering unnecessary a large space for preventing interference with other parts.

Furthermore, the fact that no rotation is made in the extension bracket 32 during vehicle steering leads to the fact of making no relative displacement of the shock absorber 44 and the coil spring 48 to the extension bracket 32, thereby preventing interference therebetween. In this connection, the extension bracket 32 is formed channel-shaped or C-shaped in cross-section, thereby surrounding the shock absorber 44 and the coil spring 48. This significantly minimizes the distance between the shock absorber 44 and the wheel 14, thus making possible to minimize the width of the wheel house, thereby to enlarge the width of the engine compartment, in combination with the fact that freedom of location of the upper control arm 40 increases. It will be understood that, in this case, the shock absorber 44 and the coil spring 48 are prevented from being injured with stone and the like since the shock absorber cylinder 44a and the coil spring lower part are covered or protected with the extension bracket 32.

Figure 7A:
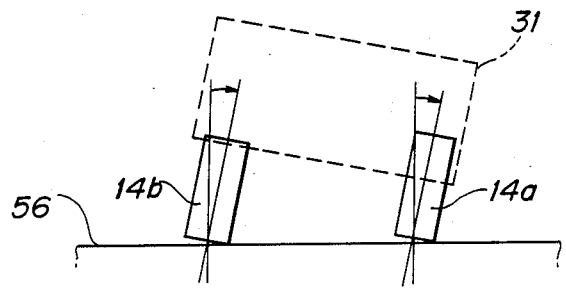

Camber angle during turn of the vehicle will be discussed hereinafter with reference to FIGS. 7A to 7C. In FIG. 7A, in which the front of the vehicle is schematically shown, the vehicle is turning to the left so that the wheel 14a is of outer side while the wheel 14b is of inner side relative to the center of turn. During the turn, the vehicle body 31 rolls and therefore the outer side wheel 14a ascends while the inner side wheel 14b descends relative to the vehicle body 31 as shown in FIG. 7A. As a result, the camber of the outer side wheel 14a relative to the ground is changed to be positive, while the same camber of the inner side wheel 14b is changed to be negative. Then both the inner and outer side wheels 14a, 14b decrease in ground contacting area in the direction of the center of turn so as to unavoidably reduce gripping force of the wheels. In this regard, if it is required during roll of the vehicle the camber of the outer side wheel 14a increases in the negative direction while that of the inner side wheel 14b increases in the positive direction.

Figure 7B:
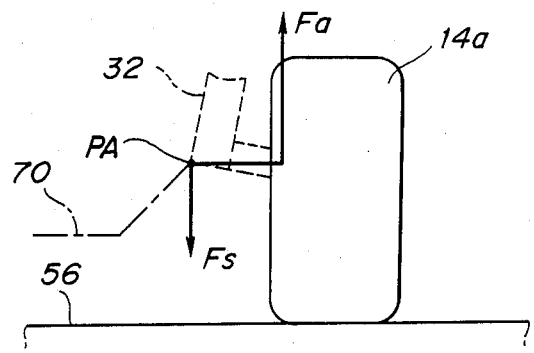
Figure 7C:
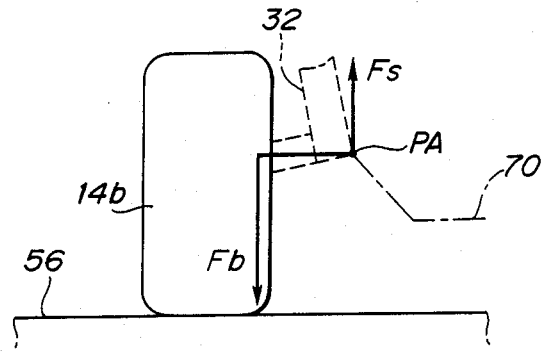

In this connection, for example as shown in FIG. 7B, reaction force Fs developed due to torsion of the stabilizer bar 70 during roll of the vehicle is applied to the point of application PA (the joint between the extension bracket 32 and the stabilizer bar 70) in the direction to cancel the force Fa for raising the outer side wheel 14a (or actually lowering the vehicle body 31) and in the direction to change the camber of the outer side wheel 14a relative to the grount onto the negative side (or in the direction of falling down the outer side wheel 14a to the inside of the vehicle). The force Fa is the largest near the center of the vehicle body. Thus, the point of application Pa resides in the extension bracket 32, which makes its upward and downward movements together with the wheels as a single body, and therefore the upward and downward movements of the wheels can be precisely transmitted to the stabilizer bar 70 without increase or decrease. Additionally, since the point of application PA resides at a location of the extension bracket 32 which location is near the center axis of the vehicle body, i.e., separate from the wheel. Accordingly, even if the force Fs is smaller, a sufficient effect can be obtained. It will be understood that the force Fb to lower the inner side wheel 14b is also cancelled by the force Fb as shown in FIG. 7C. Thus, even if roll is caused during turn or the like of the vehicle, the upward and downward movements of the wheels can be easily prevented while the camber of the wheels relative to the ground can be suppressed. Therefore, the camber of the wheels relative to the ground can be maintained suitable while maintaining the ground contacting area of the wheels larger. This does not reduce the gripping force of the wheels to the ground thus to improve safety of vehicle driving.

Moreover, during vehicle starting or braking, relative displacement force developed between the vehicle body 31 and the wheel 14 acts along an extension of the steering axis 36 on the upper control arm 40. In other words, the relative displacement force is input to a point P positioned midway between the inboard and outboard end sections of the upper control arm 40. Thus, such force input is made to the position nearer to the vehicle body 31 than in a case in which the same force input is made to the outboard end section of the upper control arm 40, and therefore less load due to such force input is applied to a portion of the vehicle body 31 to which portion the inboard end section of the upper control arm 40 is attached. This makes it possible to lighten the weight of the vehicle body portion to which the upper control arm is attached, and to minimize the size and soften the rubber insulation bushing 42 used in the joint between the upper control arm 40 and the vehicle body 31. Such a softening of the rubber insulation bushing leads to an increase in absorption efficiency for vibration input from the side of the wheel 14, thus reducing vehicle vibration and booming noise due to the vibration.

Since the joint of the extension bracket 32 and the upper control arm 40 is located at the upper part of the wheel 14, it seems to tend to be damaged by outer loads such as flying stone; however, the tip end portion of the extension bracket upper section 32b is constructed to cover the outboard end section of the upper control arm 40 thereby protecting the movable parts of the joint from such outer loads.

In the thus arranged double link type suspension system 10, the connection of the knuckle 12 and the extension bracket or member 32 is carried out as follows: The larger diameter section 34k of the pivot shaft 34f is previously press-fitted in the through-hole 12c of the knuckle upper section 12b from the lower side. The upper and lower deep groove ball bearings 34b, 34c are previously press-fitted respectively in positions. Additionally, the sealing member 34m is previously press-fitted to the lower end of the cylindrical member 34a. In this state, the pivot shaft 34f is inserted inside the inner races of the ball bearings 34b, 34c from the lower side. Then the tightening nut 34g is tightened upon the washer 34h being brought into engagement with the inner race of the roll bearing 34b. Thus, the knuckle 12 and the extension bracket 32 can be easily connected with each other in a manner to be rotatable relative to each other. Furthermore, when the pivot shaft 34f is inserted, nothing contacts with the lower lip portion 34q of the sealing member 34m thereby preventing the lower lip portion 34q from damaging and being turned up. This allows the lower lip portion 34q to be brought into uniform contact with the upper surface of the knuckle upper section 12b. Disconnection of the knuckle 12 and the extension bracket 32 can be easily accomplished by drawing out the pivot shaft 34f upon removing the seal cap 34r and the tightening nut 34g.

Moreover, since the washer 34h is biased against the inner race of the upper ball bearing 34b during the tightening operation, the lower surface of the inner race of the upper ball bearing 34b comes into contact with the upper surface of the medium diameter section 34k of the pivot shaft 34f, thereby preventing excessive and less tightening of the tightening nut 34g. In this connection, since a slight clearance is left between the lower surface of the outer race of the upper ball bearing 34b and the surface of the step section 34x of the cylindrical member 34a upon tightening of the tightening nut 34g, an unnecessary pressure is prevented from being applied to the upper ball bearing 34b. Additionally, no clearance exists between the pivot shaft 34f and the inner surface of the through-hole 12c of the knuckle upper section 12b and between the pivot shaft 34f and the ball bearings 34b, 34c. Location by tightening the nut 34g is accomplished upon contact of the inner race of the upper ball bearing 34b with the upper surface of the medium diameter section 34k of the pivot shaft 34f. Such tightening of the tightening nut 34g never causes error in other sections. As a result, no assembly error is made during assembly of the rotatable joint mechanism 34, thereby securely preventing camber angle error from being produced. Furthermore, the lower end of the cylindrical member 34a can be trebly sealed with the upper, intermediate and lower lip portions 34o, 34p, 34q, thereby effectively sealing for the lower ball bearing 34c. Moreover, sealing the upper part of the cylindrical member 34a is accomplished with the seal cap 34r, and therefore only one sliding contact seal is necessary, thereby improving reliability of sealing while contributing to cost lowering. Since the pivot shaft 34f is fixed at its lower part to the knuckle upper section 12b to be supported in a so-called cantilever state, the length of projection in the knuckle upper section 12b can be considerably shortened, thereby achieving weight-lightening of the knuckle.

Bound force input during vehicle cruising from the side of the wheel 14 is transmitted to the cylindrical member 34a through the knuckle 12, the pivot shaft 34f, and the inner face, the balls and the outer face of the ball bearing 34c, and therefore it is received by the ball bearing 34c having a relatively large diameter. Rebound force generated when the wheel 14 moves upwardly is about 1/5 of the bound force, and therefore it can be received by the ball bearing 34b having a relatively small diameter. Thus, sufficient strength and durability can be obtained by press-fitting the upper and lower ball bearings 34b, 34c into the cylindrical member 34a, and accordingly the construction of the rotatable joint mechanism 34 can be simplified while lowering production cost of the suspension system.

As a result, the suspension system of the present invention offers jointly both the advantageous effects of the above-discussed first and second prior arts, and additionally offers the unique advantageous effects summarized as follows:

(1) Since the extension member (bracket) does not turn during vehicle steering, it is possible to use the rubber insulation bushing in the joint between the upper control arm and the extension member, thereby minimizing the height of the joint as compared with the case of using a ball joint. This minimizes the height of the wheel house, thereby lowering the hood of the engine compartment.

(2) Since the relative displacement force developed between the vehicle body and the wheels during vehicle starting and bracking is input to the upper control arm at a position lying on the extension of the steering axis, this input force is applied to a location nearer to the vehicle body than in the case where the same force is input to the outboard end of the upper control arm. Accordingly, less load due to the above-mentioned input force is applied to the arm attaching portion of the vehicle body, thereby making possible weight-lightening of the vehicle body arm attaching portion and minimizing and softening of the joint. Such softening of the joint suppresses vibration transmission to the vehicle body thereby to reduce booming noise due to the vibration transmission.

(3) Since setting of the steering axis can be accomplished regardless of the upper control arm, the attaching location of the upper control arm to the vehicle body can be situated outward in the direction of the vehicle body width, so that the outboard end of the upper control arm is freely selectable. Thus, the width of the engine compartment is enlarged in combination with the above-mentioned reason. Additionally, it is possible to determine the length of the upper control arm appropriate to obtain a suitable wheel alignment.

(4) Since the extension bracket does not turn during vehicle steering, the stabilizer bar connected to the extension bracket does not swing around. Accordingly, the vehicle posture stabilizing function of the stabilizer bar and steering function are completely separated from each other, thereby preventing steering effort or force from variation due to swing-around movement of the stabilizer bar end section. This effectively prevents variation in steering effort or force caused along with variation in steering angle, while omitting a mechanism for absorbing swing-around movement of the stabilizer bar end section.

(5) Since the installation position of the stabilizer bar resides in the extension bracket or member which makes its upward and downward movements together with the wheels as a single unit, the upward and downward movements of the wheels can be precisely transmitted to the stabilizer bar without increase or decrease. Additionally since the stabilizer bar installation position resides separate from the wheels, the upward and downward movements of the wheels can be readily suppressed while applying force in the direction to suppress the change of camber of the wheel relative to the ground, thereby preventing deterioration of camber angle of the wheels relative to the ground during roll or the like of the vehicle. This increases the ground contacting area of the wheels to thereby prevent lowering in gripping force of the wheels to the ground even during turn of the vehicle, thus improving safety in vehicle driving.

While the above-discussed embodiment has been shown and described as being so arranged that the lower end section of the shock absorber 44 is connected to the knuckle upper section 12a so that the weight of the vehicle body is not supported by the lower control arm 28 thereby to minimize the rigidity of the lower control arm 28 and the rubber insulation bushing 30 and enlarge the space around the drive shaft 24, it will be appreciated that the lower end section of the shock absorber 44 may be supported to the lower control arm 28.

Although the above-discussed embodiments have been shown and described such that the pivot shaft 34f is fixed to the side of the knuckle 3 while the cylindrical member 34a is integrally formed at the side of the extension member 32, it will be understood that the pivot shaft 34f may be fixedly o connected to the side of the extension member 32 while the cylindrical member 34a is fixedly connected to the side of the knuckle 3.

While only the front suspension system for the vehicles of the front engine front wheel drive type or the four wheel drive type have been shown and described, it will be understood that the principle of the present invention may be applicable to other suspension systems such as a front suspension system for a vehicle of the front engine rear wheel drive type or a rear suspension system.

Figure 8:
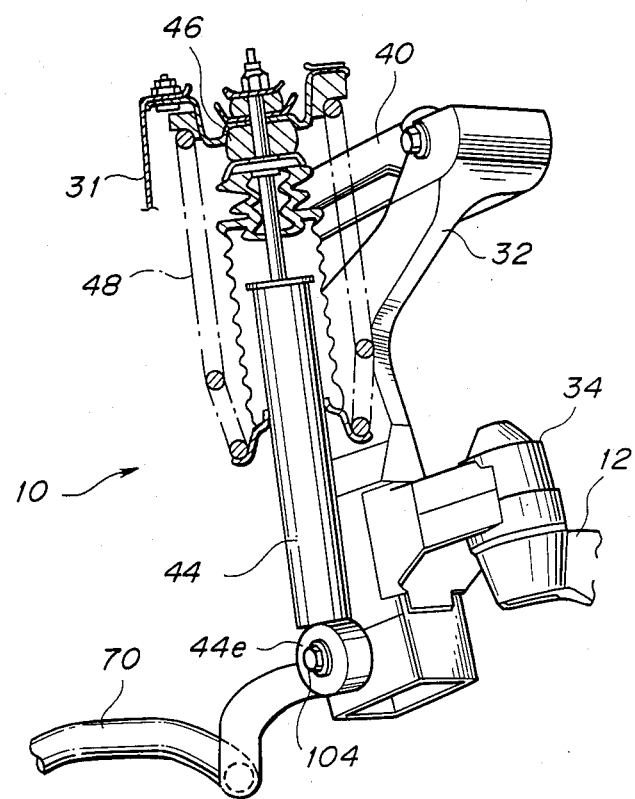
FIG. 8 is a fragmentary perspective view, partly in section, of a second embodiment of the double link type suspension system according to the present invention.
Figure 9:
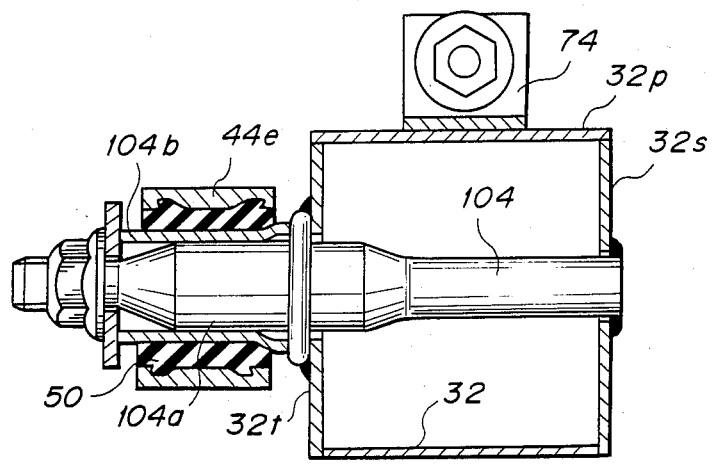
FIG. 9 is a transverse sectional view of the lower end section of the extension member in the suspension system of FIG. 8.
Figure 10:
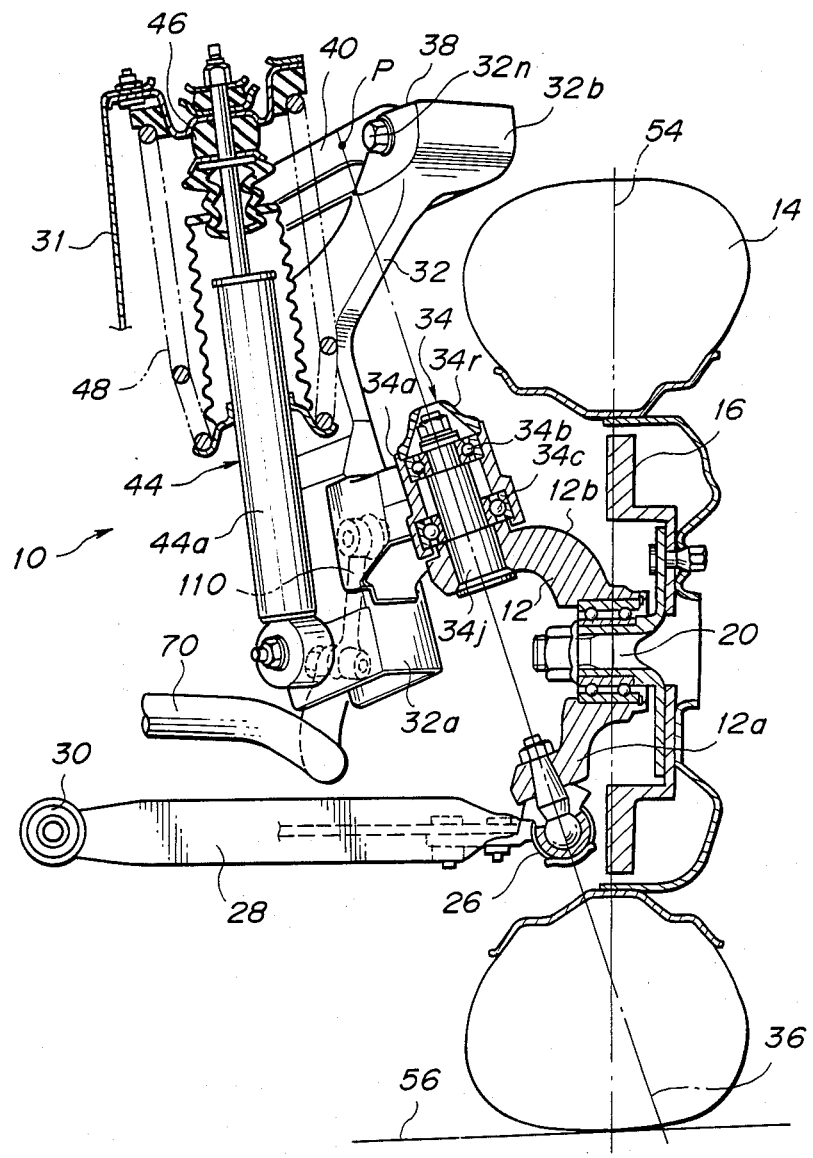
FIG. 10 is a fragmentary front elevation, partly in section, of a third embodiment of the double link type suspension system according to the present invention.

FIGS. 8 and 9 illustrate an essential part of a second embodiment of the double link type suspension system 10 according to the present invention, which is similar to the first embodiment suspension system 10 with the exception that the lower section of the shock absorber 44 is securely installed generally parallel with the extension member 32. More specifically, in this embodiment, the lower section 32a of the extension bracket 32 is formed into a hollow square pole and accordingly has two opposite plate portions 32s, 32t. An installation bolt 104 is provided to pierce the opposite side plate portions 32s, 32t and secured to them. The installation bolt 104 extends outside of the extension bracket 32 to form an extended portion 104a on which the lower section of the shock absorber outer cylinder 44a is mounted through a collar 104b, the rubber bushing 50 and the collar 32e fixed to the outer cylinder 44a.

Figure 11:
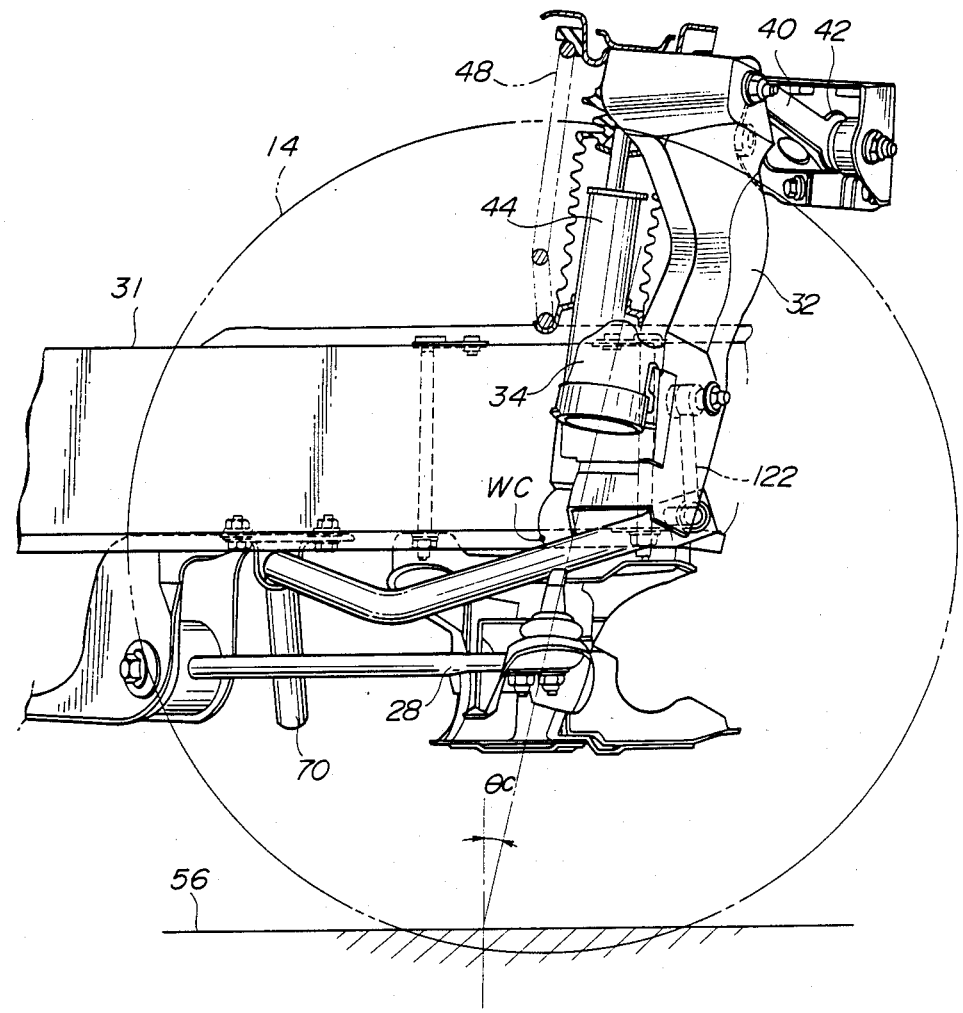
FIG. 11 is a side elevation of the suspension system of FIG. 10.

With this arrangement, since the shock absorber 44 is located outside of the extension bracket 32, installation and removal operations of the shock absorber 44 are improved while the shock absorber 44 tends to contact with stream of ambient air to improve cooling effect to the shock absorber 44. It is preferable to dispose the shock absorber 44 on the front side of the extension bracket 32 relative to the stream of ambient air in order to further improve the cooling effect thereto. Additionally, this embodiment does not require formation of the extension bracket 32 into a generally channel-shape. Even in case of using the generally channel-shaped extension bracket 32, a plate member is fixed to cover the open part of the channel-shaped extension bracket 32 to have a closed cross-section to increase the strength of the extension bracket 32. Accordingly the extension bracket 32 having the closed cross-section can be small-sized and lightened in weight as compared with the channel-shaped extension bracket even on the assumption the both have the same strength. Furthermore in this embodiment, caster angle ($\theta c$ as shown in FIG. 11) can be easily adjusted to change the dimension of the extension bracket 32 without changing the installation location of the coil spring 48.

Also in this embodiment, the stabilizer bar 70 is installed in the same manner as in the first embodiment suspension system, and therefore the end section of the stabilizer bar 70 is secured at the position closer to the center axis of the vehicle body 31. More specifically, the end section of the stabilizer bar 70 is securely connected through the joint structure 72 to the installation plate 32p of the extension bracket lower end section 32a.

Figure 12:
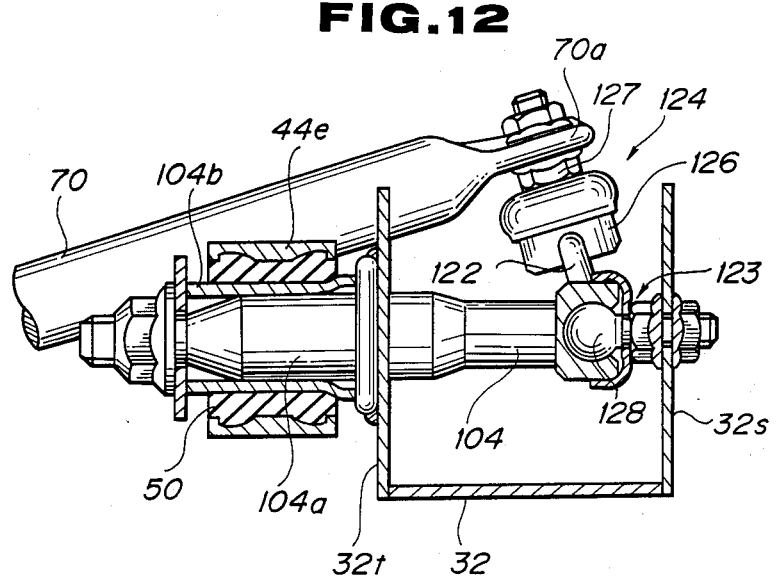
FIG. 12 is a transverse sectional view of the lower end section of the extension member, showing the connection between the extension member and the stabilizer bar.

FIGS. 10 to 13 illustrate a third embodiment of the double link type suspension system according to the present invention, which is similar to the second embodiment. In this embodiment, as best shown in FIG. 12, the lower end section 32a of the extension bracket 32 is formed channel-shaped to have the opposite plate portions 32s, 32t through which the installation bolt 104 pierces and secured thereto. The outer cylinder 44a of the shock absorber 44 is mounted at its lower end section on the extended portion 104a of the installation bolt 104 through the collar 104b, the rubber bushing 50 and the collar 32e. The shock absorber 44 is located on the front side of the extension bracket 32 relative to the vehicle body 31, so that air stream effectively strikes against the shock absorber 44 to improve the cooling effect to the shock absorber 44.

Figure 13:
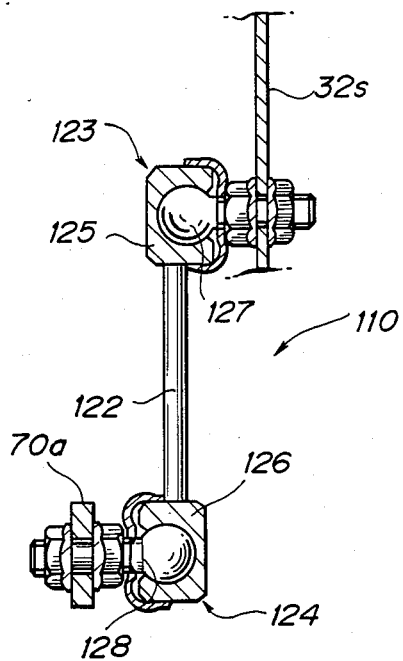
FIG. 13 is a vertical section view of a joint structure through which the extension member lower end section and said stabilizer bar in FIG. 12 are connected.

As shown in FIGS. 12 and 13, the end section 70a of the stabilizer bar 70 is movably connected through a joint structure 110 to the plate portion 32s of the lower end section 32a of the extension bracket 32. More specifically, the joint structure 110 includes a connecting rod 122 having opposite end sections which are fixedly provided respectively with sockets 125, 126 of ball joints 123, 124. A ball stud 127 received in the socket 125 is located inside the channel-shaped extension bracket lower end section 32a and pierces through the plate portion 32s to be fixedly secured thereto by nuts. Another ball stud 126 received in the socket 126 pierces the end section 70a of the stabilizer bar 70 and fixed thereto by nuts. It will be seen that the ball joint 123 is positioned upward of the installation bolt 104 with respect to the vehicle body 31.

It is to be noted that, in this embodiment, the rotatable joint mechanism 34 for connecting the knuckle upper section 12b and the extension bracket 32 is positioned rearward of the center axis WC of the wheel 14 with respect to the vehicle body 31 as clearly shown in FIG. 11. Additionally, the stabilizer bar end section 70a and the joint structure 110 therefore are also positioned rearward of the wheel center axis WC.

Movement of the vehicle provided with the suspension system of this embodiment will be discussed hereinafter with reference to FIGS. 14A and 14B. In FIG. 14A, in which the back of the vehicle is schematically shown, the wheel 14a is on the outside while the wheel 14b is on the outside relative to the center of turn of the vehicle. During roll of the vehicle, most of the weight of the vehicle is applied to the outer side wheel 14a, and therefore the gripping force of the outer side wheel 14a greatly affects driving stability of the vehicle. Usually, the outer side wheel 14a moves to rise relative to the vehicle body 31, thereby to increase the camber angle relative to the ground in positive direction. This decreases the ground contacting are of the wheel, thus lowering the gripping force of the wheel to the ground. In order to prevent this, it is required to increase the camber angle of the outer side wheel 14a in negative direction.

In this regard, with the third embodiment of FIGS. 10 to 13, the stabilizer bar 70 is installed to the extension bracket 32 which makes its upward and downward movements together with the wheels, and therefore the movement of the wheels can be precisely transmitted to the stabilizer bar 70 without increase or decrease. Additionally, the installation position of the stabilizer bar 70 to the extension bracket 32 is located rearward of the wheel center axis WC with respect to the vehicle body, and the upper section 12b of the knuckle 12 serving to decide a kingpin angle is connected to he extension bracket 32. Therefore, as shown in FIG. 14B in which the left side is the front of the vehicle, the reaction force Fs due to the roll rigidity of the stabilizer bar acts in the direction to increase caster angle $\theta c$. Accordingly, the camber angle r relative to the ground of the vehicle during roll increases in negative direction, so that the ground contacting area of the outer side wheel becomes difficult to decrease, thereby preventing the gripping force of the wheel from lowering. This effectively improves the driving stability of the vehicle.

In other words, the camber angle r relative to the ground is calculated by the following equation (1):

$$r = \theta c \times \sin\theta + \theta k \times (1 - \cos\theta) \quad (1)$$

where $\theta$ is a turn angle of the wheel; $\theta c$ is a caster angle; and $\theta k$ is a kingpin angle.

The relationship between the camber angle r relative to the ground and the turn angle $\theta$ (for sleering) of the wheel is calculated according to the above equation (1) on the assumption that the kingpin angle $\theta k$ is 13 degrees, the caster angle $\theta c$ is 10 degrees or 5 degrees. This relationship is shown in the graph of FIG. 15 in which a line $L_1$ indicates a case in which the caster angle $\theta c$ is 10 degree while a line $L_2$ indicates a case in which the caster angle $\theta c$ is 5 degrees. The graph of FIG. 15 demonstrates the following fact: Regarding the outer side wheel whose turn becomes minus, the camber angle r relative to the ground in the case of the line $L_1$ increases in the negative direction as the turn angle $\theta$ increases. Accordingly it will be appreciated that increasing the caster angle is effective to increase the camber angle of the outer side wheel in the negative direction.

Furthermore, since the installation position of the stabilizer bar 70 is located rearward of the wheel axis WC and closer to the center axis of the vehicle, the camber angle of the outer side wheel further increases in the negative direction thereby to obtain a sufficient gripping force of the wheels to the ground, thus further improving safety of vehicle driving.

Figure 16:
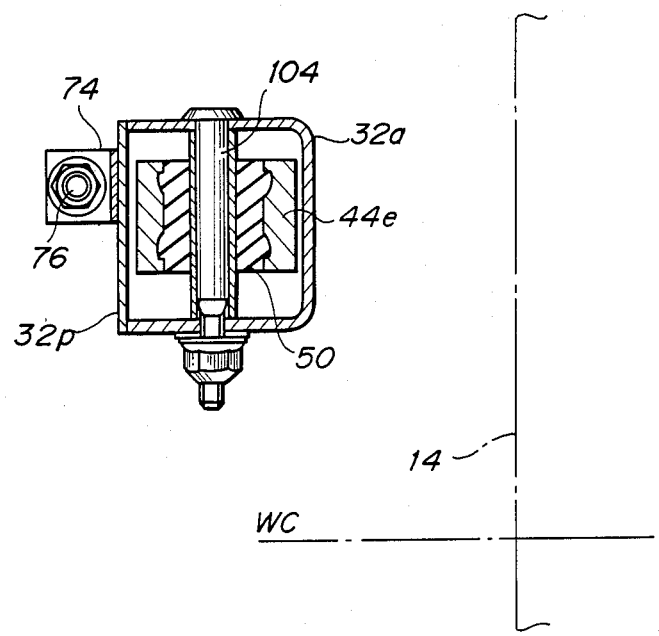
FIG. 16 is a transverse sectional view similar to FIG. 3 but showing a part of a fourth embodiment of the double link type suspension system in accordance with the present invention.

FIG. 16 shows a part of a fourth embodiment of the double link type suspension system according to the present invention, which is similar to the first embodiment of FIGS. 1 to 5. In this embodiment, the installation position of the stabilizer bar 70 to the extension bracket 32 is located rearward of the center axis WC of the wheel with respect to the vehicle body similarly to the third embodiment of FIGS. 10 to 13. Additionally, the installation position of the stabilizer bar 70 is located closer to the center axis of the vehicle body. Therefore the camber angle of the wheel during roll of the vehicle can increase in the negative direction. As a result, the ground contacting area of the wheel further increases to thereby improve vehicle driving stability.

In this embodiment, since the lower end section 32a itself of the extension bracket 32 is located rearward of the wheel center axis, the end section 70a of the stabilizer bar 70 is fixedly attached to a suitable position of the extension bracket 32. If the stabilizer bar end section 70a is attached to the rear side of the extension bracket 32, the point of application of the reaction force of the stabilizer bar 70 is shifted rearward.

What is claimed is:

1. A double link type suspension system for a vehicle, comprising:
   a knuckle for rotatably supporting a wheel of the vehicle;
   a lower control arm for swingably connecting a lower section of said knuckle and side of a vehicle body, said lower control arm being movably connected through a first joint to the knuckle lower section;
   an upper control arm movably connected to the side of the vehicle body;
   an extension member for movably connecting an upper section of said knuckle and said upper control arm, said extension member being jointed to the knuckle upper section to be rotatable around an axis line passing through said first joint; and
   a stabilizer bar having an end section which is connected to said extension member at a position inside said axis line relative to the vehicle body.

2. A double link type suspension system as claimed in claim 1, further comprising a joint mechanism through which the knuckle upper section is movably connected to said extension member, said joint mechanism including a cylindrical member whose axis is aligned with said axis line, at least two rolling bearings supported inside said cylindrical member, and a pivot shaft disposed inside said rolling bearings.

3. A double link type suspension system as claimed in claim 2, wherein the end section of said stabilizer bar is connected to said extension member at a position closer to a center axis of the vehicle body than said joint mechanism.

4. A double link type suspension system as claimed in claim 1, wherein said stabilizer bar is connected to said extension member at a position which is rearward of a center axis of the wheel with respect to the vehicle body.

5. A double link type suspension system as claimed in claim 1, wherein said stabilizer bar end section is connected through a joint structure to the first end section of said extension member.

6. A double link type suspension system as claimed in claim 5, wherein said joint structure includes a bracket fixedly secured to aid extension member first end section, first and second elastomeric members disposed on opposite sides of said bracket, third and fourth elastomeric members disposed on opposite sides of said stabilizer bar end section, a connecting rod piercing said first elastomeric members, said bracket, said second elastomeric member, said third elastomeric member, said stabilizer bar end section and said fourth elastomeric member, and means for fastening said first and second elastomeric bushings together with said bracket to said connecting rod for fastening said third and fourth elastomeric members together with said stabilizing bar end section to said connecting rod.

7. A double link type suspension system as claimed in claim 1, wherein said at least two rolling bearings include first and second rolling bearings which are located at axially opposite end sections.

8. A double link type suspension system as claimed in claim 1, wherein said pivot shaft is formed with a threaded portion, wherein said joint mechanism includes a tightening nut engaged with said pivot shaft threaded portion and in contact with inner race of one of said rolling bearings.

9. A double link type suspension system as claimed in claim 1, wherein said cylindrical member of said joint mechanism is fixedly connected to said extension member, wherein said pivot shaft of said joint mechanism is fixedly connected to the upper section of said knuckle.

10. A double link suspension system as claimed in claim 1, wherein said pivot shaft is coaxial with said cylindrical member.

11. A double link type suspension system as claimed in claim 7, wherein said first rolling bearing is larger in inner diameter than said second rolling bearing.

12. A double link suspension system as claimed in claim 11, wherein said pivot shaft is fixedly supported in said knuckle upper section and includes a first section at which said pivot shaft is fixedly supported in said knuckle upper section, a second section integral with said first section, and a third section integral with said second section and smaller in diameter than said second section, said first and second rolling bearings being mounted respectively on said first and second sections.

13. A double link type suspension system as claimed in claim 1, further comprising a plurality of annular elastic members interposed between and in contact with said pivot shaft and said cylindrical member.

14. A double link type suspension system as claimed in claim 13, wherein each annular elastic member includes an elastomeric ring in slidable contact with the peripheral surface of said pivot shaft.

15. A double link type suspension system as claimed in claim 13, wherein each annular elastic member includes an elastomeric ring in slidable contact with inner peripheral surface of said cylindrical member.

16. A double link type suspension system as claimed in claim 1, further comprising a shock absorber having a first end section connected to the vehicle body side, and a second end section movably connected to said extension member.

17. A double link type suspension system as claimed in claim 1, wherein said extension member is rotatable around said axis line.

18. A double link type suspension system as claimed in claim 16, wherein said lower control arm has a first end section movably connected to said knuckle lower section, and a second section movably connected to the vehicle body side.

19. A double link type suspension system as claimed in claim 18, wherein said extension member has a first end section provided with said joint mechanism, and a second end section.

20. A double link type suspension system as claimed in claim 19, wherein said upper control arm has a first end section movably connected to the second end section of said extension member, and a second end section movably connected to the vehicle body side.

21. A double link type suspension system as claimed in claim 1, wherein the vehicle is of a front engine front wheel drive type.

22. A double link type suspension system as claimed in claim 1, wherein the vehicle is a four wheel drive type.

23. A double link type suspension system as claimed in claim 1, wherein said wheel has an axle shaft connected through a constant velocity joint to a drive shaft which is driven by an engine, said axle shaft being rotatably journalled by said knuckle.

24. A double link type suspension system as claimed in claim 1, wherein said first joint is a ball joint whose axis is aligned with said axis line.

25. A double link type suspension system as claimed in claim 24, wherein said ball joint includes a ball stud secured to said knuckle lower section, said ball stud having an axis aligned with said axis line, and a retainer for movably supporting said ball stud, secured to said lower control arm.

26. A double link type suspension system as claimed in claim 20, wherein said extension member second end section and said upper control arm first end section are connected by a second joint, said second joint being separate from a vertical plane containing a point in a horizontal plane passing through said second joint, said axis line passing through said point, said second joint being located between said vertical plane containing said point and a wheel vertical plane containing center line of said wheel and perpendicular to axis of rotation of said wheel.

27. A double link type suspension system as claimed in claim 26, wherein said axis line serves as a steering axis.

28. A double link type suspension system as claimed in claim 26, wherein said point resides in said upper control arm and separate from said second joint.

29. A double link type suspension system as claimed in claim 28, wherein said axis line intersects said wheel vertical plane at a point above a horizontal plane at which said wheel is in contact with road surface.

30. A double link type suspension system a claimed in claim 29, wherein said axis line intersects said horizontal plane at a point outside of said wheel vertical plane in a lateral direction of the vehicle body.

31. A double link type suspension system as claimed in claim 20, wherein said knuckle upper section is rotatably connected to said extension member first end section to which said shock absorber second end section is connected.

32. A double link type suspension system as claimed in claim 31, wherein said shock absorber second end section is connected through an elastomeric bushing to said extension member first end section.

33. A double link type suspension system as claimed in claim 16, wherein said second joint includes a rod member fixedly secured to said extension member second end section, and first and second elastomeric bushings securely mounted on said rod member and located on the opposite sides of said extension member second end section, said upper control arm first end section being mounted on said elastomeric bushings.

34. A double link type suspension system as claimed in claim 33, wherein said upper control arm first end section has a cylindrical portion which is mounted on said first and second elastomeric bushings.

35. A double link type suspension system as claimed in claim 16, wherein said extension member is generally channel-shaped and disposed to surround at least a part of periphery of said shock absorber.

36. A double link type suspension system as claimed in claim 35, wherein said extension member is formed of a press-formed sheet metal and includes a generally vertically extending base plate portion located between said shock absorber and said wheel, and first and second side plate portions integral with said base portion and extending along said base portion, said base plate portion and first and second side plate portions defining an elongate space in which at least a part of said shock absorber is positioned.

37. A double link type suspension system as claimed in claim 16, wherein said first end section of said extension member is fixedly secured to an outer tube of said shock absorber.

38. A double link type suspension system as claimed in claim 26, wherein said second joint is situated above the outer peripheral surface of said wheel.

39. A double link type suspension system as claimed in claim 1, wherein said rolling bearings are deep groove ball bearings.

* * * * *